(12) United States Patent
Reardon

(10) Patent No.: US 12,411,597 B2
(45) Date of Patent: Sep. 9, 2025

(54) DRAG AND DROP INTERACTIONS FOR A BROWSER SOFTWARE APPLICATION

(71) Applicants: Atlassian Pty Ltd., Sydney (AU); Atlassian US, Inc., San Francisco, CA (US)

(72) Inventor: Alexander James Reardon, Sydney (AU)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 0 days.

(21) Appl. No.: 17/956,617

(22) Filed: Sep. 29, 2022

(65) Prior Publication Data
US 2024/0111410 A1 Apr. 4, 2024

(51) Int. Cl.
*G06F 3/048* (2013.01)
*G06F 3/0486* (2013.01)
*G06F 16/957* (2019.01)

(52) U.S. Cl.
CPC .......... *G06F 3/0486* (2013.01); *G06F 16/957* (2019.01)

(58) Field of Classification Search
CPC .............................. G06F 3/0486; G06F 16/957
See application file for complete search history.

(56) References Cited

U.S. PATENT DOCUMENTS

| | | | |
|---|---|---|---|
| 11,163,669 B1* | 11/2021 | Torun | G06F 8/65 |
| 2004/0100501 A1* | 5/2004 | Dornback | G06F 3/0486 |
| | | | 715/769 |
| 2018/0284956 A1* | 10/2018 | Rommel | G06F 16/958 |
| 2018/0335912 A1* | 11/2018 | Nilo | G06F 3/0412 |
| 2024/0053879 A1* | 2/2024 | Wang | G06F 3/04883 |

* cited by examiner

*Primary Examiner* — Aleksey Olshannikov
(74) *Attorney, Agent, or Firm* — Brownstein Hyatt Farber Schreck, LLP

(57) ABSTRACT

A method and computer-readable medium for animating a drag and drop operation starting in a first browser window and ending in a second browser window are disclosed. The method includes detecting, in the first browser window, a drag start event associated with a draggable element displayed on the first browser window, and communicating, by the first browser window, data about the draggable element to a side channel. The method further includes detecting, in second browser window, that the draggable element has entered the second browser window, retrieving, by the second browser window, the data about the draggable element from the side channel, and causing, an animation rendering module of the second browser window, to animate the drag and drop operation in the second browser window based on the data about the draggable element retrieved from the side channel.

19 Claims, 9 Drawing Sheets

DRAG AND DROP INTERACTIONS FOR A BROWSER SOFTWARE APPLICATION

TECHNICAL FIELD

Aspects of the present disclosure are directed to graphical user interfaces and in particular to improved drag and drop animations in graphical user interfaces.

BACKGROUND

Background information described in this specification is background information known to the inventors. Reference to this information as background information is not an acknowledgment or suggestion that this background information is prior art or is common general knowledge to a person of ordinary skill in the art.

Graphical user interfaces allow users to interact with a software program or application. Traditionally, users may enter text or provide other user input to various regions or fields of a graphical user interface. Menu controls, buttons, or other similar items may also be used to provide input through a graphical user interface. Using some traditional graphical user interfaces, it can be difficult or inefficient to provide input using traditional fields or menu controls. The techniques described herein can be used to improve the effectiveness and efficiency of graphical user interfaces, particularly for applications implemented through a browser.

SUMMARY

Example embodiments described herein are directed to a computer-implemented method for animating a drag and drop operation starting in a first browser window and ending in a second browser window. The computer-implemented method includes detecting, at a drag and drop module of the first browser window, a drag start event associated with a draggable element displayed on the first browser window and communicating, by the drag and drop module of the first browser window, data about the draggable element to a side channel. The computer-implemented method further includes detecting, at a drag and drop module of the second browser window, that the draggable element has entered the second browser window, retrieving, by the drag and drop module of the second browser window, the data about the draggable element from the side channel, and causing, an animation rendering module of the second browser window, to animate the drag and drop operation in the second browser window based on the data about the draggable element retrieved from the side channel.

Some example embodiments are directed to a computer processing system including a processing unit, a communication interface, and a non-transitory computer-readable storage medium storing instructions. When these instructions are executed by the processing unit, they cause a browser application to perform the computer-implemented method described above.

Still other example embodiments are directed to a non-transitory storage medium storing instructions executable by processing unit to cause a browser application to perform the computer-implemented method described above.

Figure 1A:
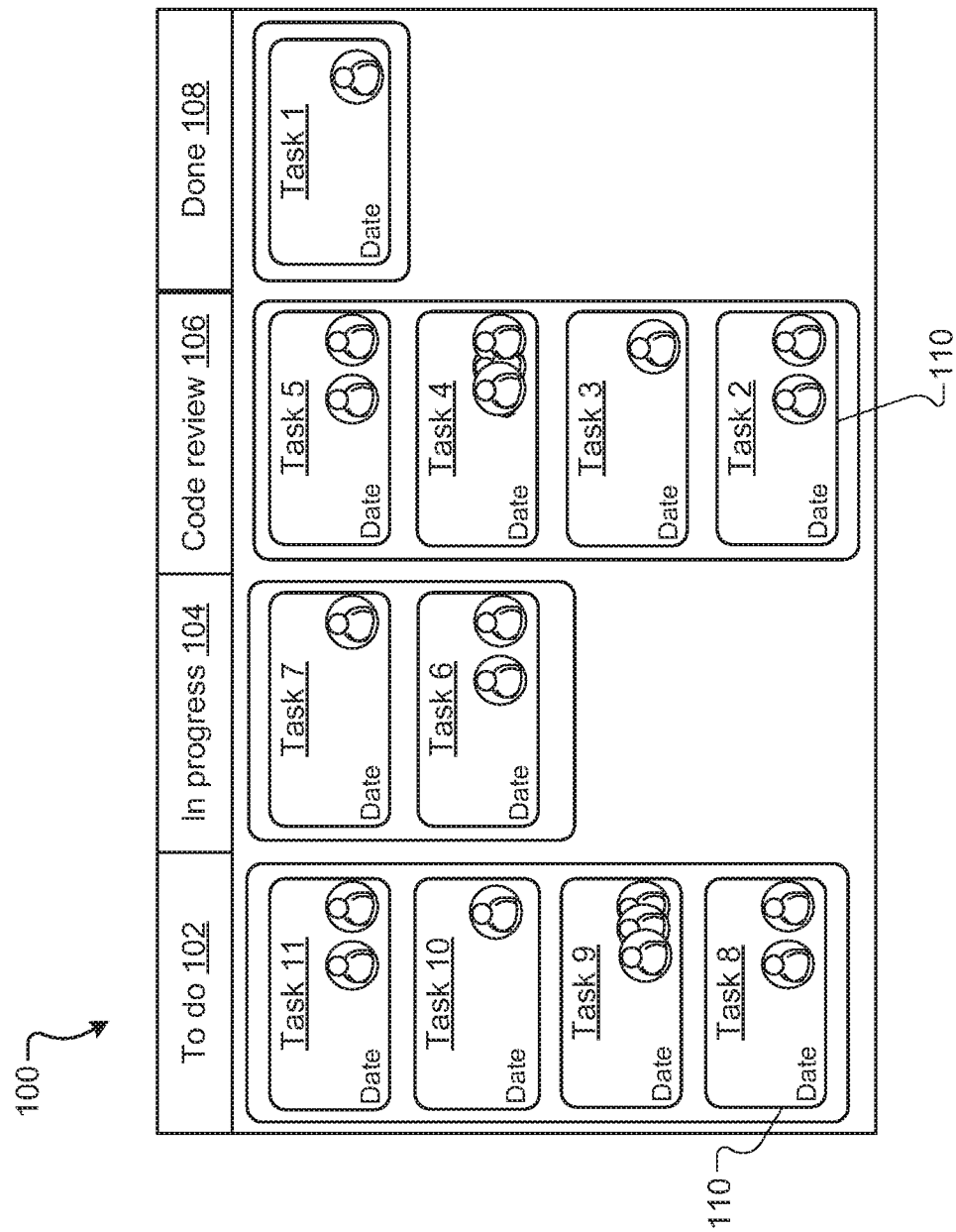
FIG. 1A is a diagram of an example virtual board.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Drag and drop (DND) is an interaction functionality applied to graphical user interfaces and in particular to web pages that allows users to move elements on a web page. In particular, it is an interaction functionality that allows a user to select an element, drag the element to a desired "drop target," and then drop the element at that target.

Generally speaking, there are a few different methods for displaying a DND animation in web pages. However, it is desirable to have an improved DND animation that addresses at least some of the limitations of conventional DND animations. For instance, the presently disclosed DND animations are described with reference to object tracking systems and or webpages that display lists or virtual boards. However, it will be appreciated that this is merely exemplary and that the presently disclosed DND animations can be used with any computer programs or systems that create webpages in which elements (also interchangeably called objects in this disclosure) can be dragged and dropped.

Overview

Generally speaking, various computing applications and systems (such as object tracking systems) provide mechanisms for creating and rendering objects, object states, and transitioning objects between states within a virtual board environment.

As used herein, an object tracking system (or object tracking application) is any system (or application) that at least facilitates the tracking of objects between states and the visualization of objects in object states by generation, rendering and display of virtual boards.

One example of an object tracking application (as referred to in the present context) is Trello. Trello allows users to create objects in the forms of cards or objects and object states in the form of lists or columns. In order to change an object state in Trello an object is transitioned from one list to another. For example, a Trello user may set up a virtual board (a list of lists) having one or more lists such as "To Do," "In Progress," and "Completed." A user may then create cards in respect of particular tasks that need to be done and add them to the "To Do" list: for example, a "grocery shopping" card, a "washing up" card, an "organize house party" card etc.

A further example of what the present disclosure refers to as an object tracking application is Jira. Jira allows users to create objects in various forms, for example issues or, more generally, work items. A work item in Jira is an object with associated information and an associated workflow, that is, a series of states through which the work item transitions over its lifecycle. Any desired workflow may be defined for a given type of work item. Further examples of what the present disclosure refers to as an object tracking application are Bugzilla, and Asana, to name but a few.

Object tracking applications such as those described above often provide graphical user interfaces for displaying the current state of objects maintained by the application and allowing users to move objects (e.g., tasks in Trello, work items in Jira) between states (or lists). In both Trello and Jira such graphical user interfaces are referred to as virtual boards. A board (also interchangeably referred to as a virtual board herein) is generally a tool for workflow visualization. Generally speaking, a board includes cards, columns, and/or swimlanes to visualize workflows in an effective manner. Each card in the board may be a visual representation of an object (e.g., task in Trello, work item in Jira) and may include information about the object, such as deadlines, assignee, description, etc. Each column in the board represents a different state (e.g., stage of a workflow in Jira or a list in Trello). The cards typically progress through the columns until their completion. Swimlanes are horizontal lanes that can be used to separate different activities, teams, classes or services, etc.

FIG. 1A provides an example virtual board 100, which shows a workflow to track software development projects. In particular, the board 100 includes four lists or columns, each corresponding to a workflow state: TO DO 102; IN PROGRESS 104; CODE REVIEW 106; and DONE 108. Board 100 also includes several cards 110, i.e., visual representations of objects (work items in the present context), each of which is in a particular column according to the current state of the object. Each card may include information about the underlying object—e.g., it may include an object title and description, a date by which the object is to be completed or was completed, and information about one or more users assigned to complete the object. It may include other content as well, including, but not limited to: text; icons; pictures; and video.

Typically, the cards/objects 110 displayed in a virtual board are interactive and/or 'draggable.' That is, these cards can be moved from one location to another in the virtual board based on user input control, e.g., via a mouse, or touchscreen. Further, the columns in the virtual boards are themselves 'draggable' and also 'droppable.' That is, a user can re-arrange the lists/columns in any desired order by dragging and dropping the lists on the user interface and the area of the user interface occupied by a given column is a drop target in which draggable cards/object 110 can be dropped. Accordingly, users can move cards around within a particular column, for example by selecting and dragging or other means, to change the order of cards in the column. When a card is moved within a list, the state of the card does not change. For example, a card that is positioned at the top of a list can be moved to a chosen position lower down that same list such that the state of the card does not change, only the position of the card within the state is changed.

Further, users can transition cards between columns/lists, for example by selecting and dragging, from its current column to another one. For example, once the user has completed task 11 (in the virtual board 100 shown in FIG. 1), the user can select and drag the corresponding card from the "To Do" list and drop it into the "Completed" list. If the user has started but not completed work on this task they can instead select and drag the corresponding card from the "To Do" list to be dropped into the "In Progress" list.

Figure 1B:
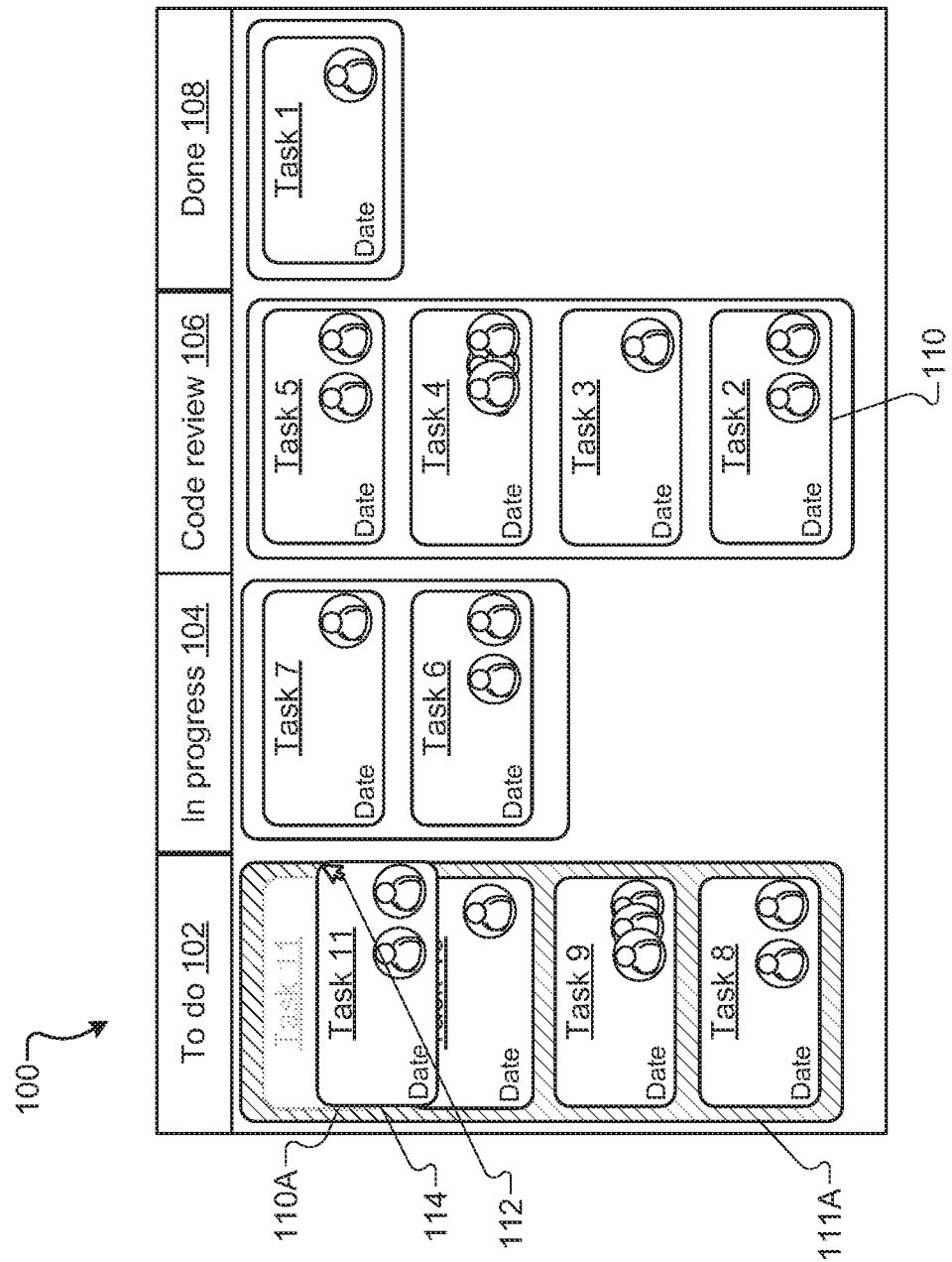
FIGS. 1B-1D are diagrams showing an example virtual board during an example DND operation at three different points in time.
Figure 1C:
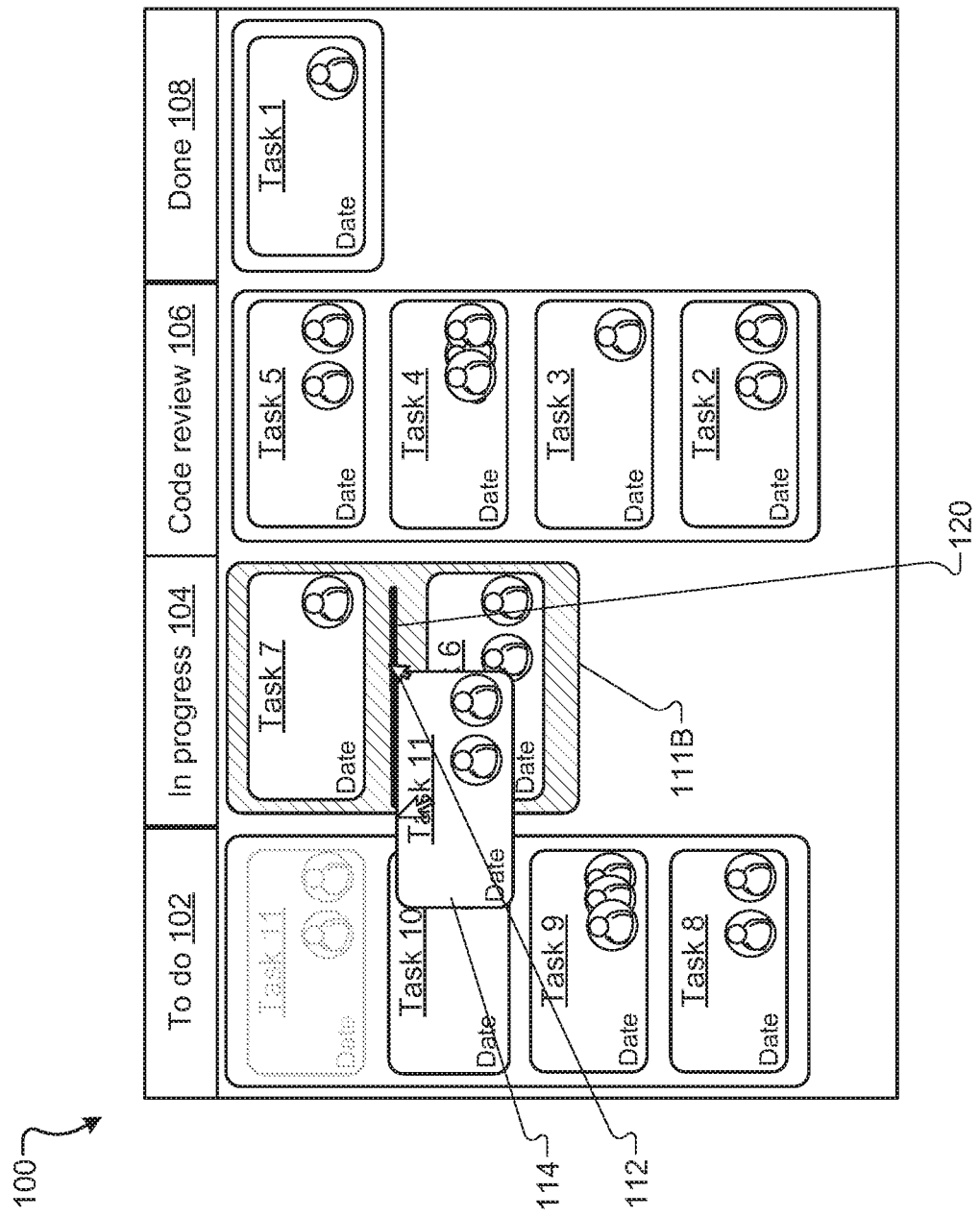
Figure 1D:
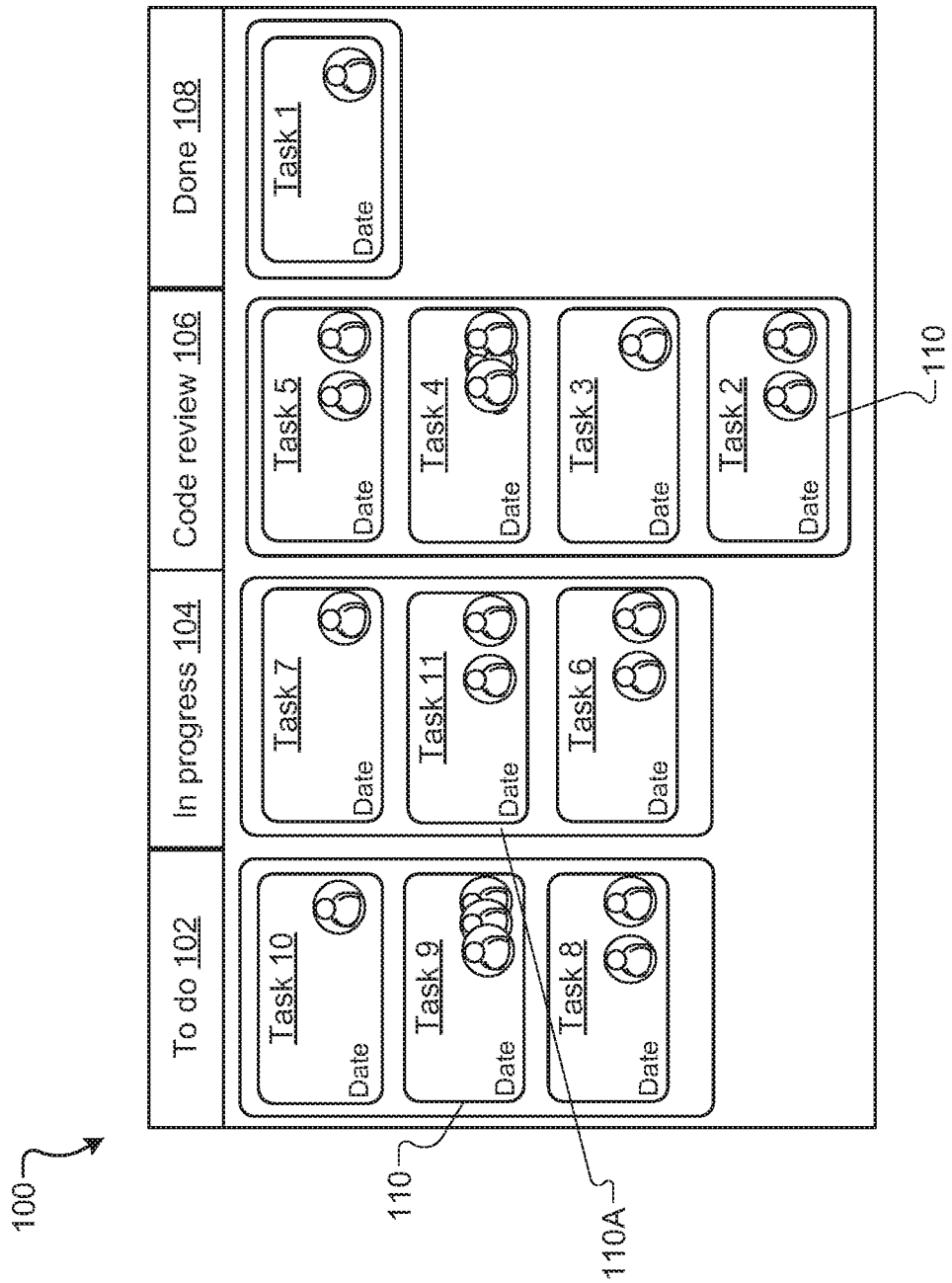
Figure 1E:
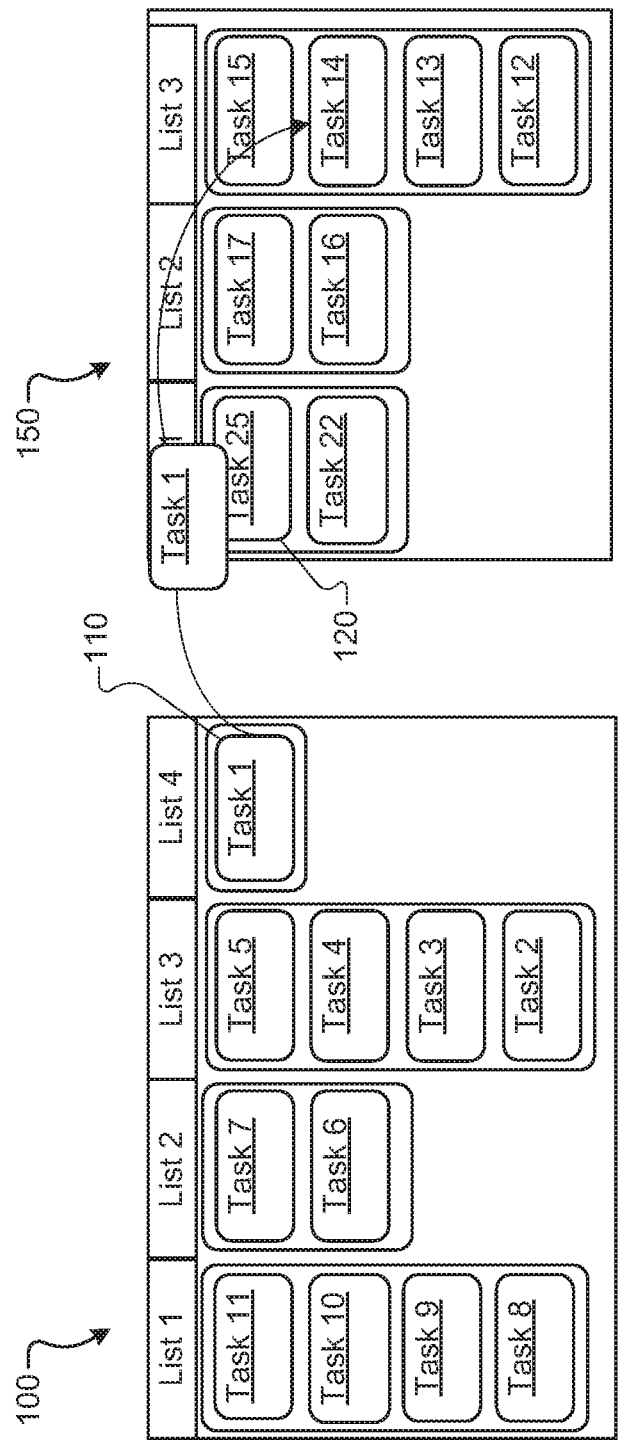
FIG. 1E shows a schematic of a DND operation across two virtual boards.

Typically, when a user drags a card from one location to another using an input control, the transition of the card from the first location to the second is animated and other objects in the destination can be animated to move out of the way of the dragged object so that it can be dropped at the desired destination. FIGS. 1B-1D depict this animation.

In particular, FIG. 1B, shows the board 100 at a first point in time, where the user has initiated a DND operation on card 110A by selecting card 110A with a cursor 112 and dragging card 110A from its original position in column 102. As the card 110A is selected, the translucency of the card 110A is increased but it remains in its original location while a ghost image 114 having a lower translucency is displayed and attached to the cursor position 112 and moves along with the cursor. The cursor 112 at this stage still hovers over a drop target 111A overlaying column 102 and has not yet moved into a drop target overlaying another list on the board. At this stage, the user interface shows card 110A is moved (e.g., by a distance that corresponds to the distance by which the cursor 112 has moved from its original position when the drag operation started to its current position), and highlights the drop target 111A of the TO DO list (e.g., in a color).

FIG. 1C, shows the board 100 at a second point in time, where the user has dragged cursor 112 and the attached ghost card 114 such that cursor 112 is now hovering over a drop target 111B overlaying column 104. In response to this, the user interface stops highlighting the drop target 111A and highlights drop target 111B overlaying column 104. Further, the user interface shows a visible marker (e.g., line 120) in column 104 at the position of the cursor 112.

FIG. 1D shows board 100 at a third point in time, where the user has dropped (that is, deselected by cursor 112) card 110A at the position shown in FIG. 1C between the location of cards representing 'TASK 7' and 'TASK 6.' Card 110A is therefore deleted from its original location, and displayed in the new location on this list. The ghost image is deleted, and tasks 10, 9 and 8 move up by one place in column 102. The DND operation then ends. This completion of the DND operation is also referred to as a card transition.

The animation sequence described above improves user experience when dragging and dropping objects within a virtual board and allows users to feel like they are moving physical objects around.

However, such DND operations are usually limited to a given virtual board or webpage and it has not been possible to perform such DND operations between virtual boards or webpages in the past. For example, consider the situation shown in FIG. 1E, where a user is concurrently viewing two virtual boards—board 100 and board 150 in different browser windows or tabs. In such cases, users are generally able to drag and drop objects within a virtual board, but are unable to move a card, e.g., card 110 from list 4 in virtual board 100 to list 3 in virtual board 150.

Although it is generally possible to drag files from external sources to a webpage (e.g., to drag a file from a user's desktop to a cloud storage service webpage), the manner in which this DND operation is handled by standard DND systems cannot be used when transferring objects or elements from one webpage to another. There are a number of reasons for this.

First, when dragging elements, which represent entities or elements (e.g., cards in virtual boards), information about the dragged element is important for the second window as it needs this information to apply conditional logic on droppable objects in the webpage. Conventional DND systems are unable to provide this information during the dragging operation and only provide some information about the external file that is being dragged into the webpage once the external file has been dropped on a valid drop target.

Second, conventional DND systems have limited mechanisms to pass information back to the source webpage of the result of a DND operation in a target webpage. This may be acceptable when a file is simply being copied from a local folder to a cloud folder displayed in a webpage as no changes need to be made to the dragged file in the local folder. However, this is an issue in the case of virtual boards, as the source virtual board may need to be updated in response to the DND operation. For example, if a card has been successfully dropped in a destination virtual board, the source virtual board may wish to delete the card. However, without any knowledge of the DND operation in the destination virtual board, the source virtual board is unable to accurately alter its display.

To address this, aspects of the present disclosure provide a new method and system for performing drag and drop operations on elements/objects across browser windows or tabs. In particular, aspects of the present disclosure introduce novel drag and drop systems that pass information about the element being dragged in the source browser window to the DND system of the destination browser window during a drag and pass information back from the destination browser window to the source browser window when a drop operation occurs. This way, both the source and the destination browser windows are able to compute where the dragged element is at any given time, determine valid drop targets for the dragged element and update the displays on each of the source and destination browser windows upon completion or termination of the drag and drop operation.

The information may be passed between the source browser window and the destination browser window by way of a side channel. In one example, the side channel may be the dragged element itself. In this case, the source browser window may add information about the draggable item to a drag event and the destination browser window may be able to extract the information about the dragged element from a DND event detected in the destination browser window. Information from the destination browser window may be passed to the source browser window regarding a completed or terminated DND operation via a "drop effect" event that is triggered when the object is dropped. Typically, there would be 'null' drop effect if the DND operation were terminated, there would be a 'copy' drop effect if the DND operation was completed and a copy of the dragged item is pasted in the drop target, and there would be a 'move' drop effect if the DND operation was completed and the dragged item was moved to the drop target. If the drop effect is null, the source browser window can determine that the DND operation was terminated and ignore the DND operation. Similarly, if the drop effect is 'copy,' the source browser window can determine that a copy of the dragged item is pasted in the other window and can ignore the operation as the operation does not change the source webpage and if the drop effect is 'move,' the source browser window can determine that the dragged object was moved to a drop target in the second browser and it can remove the dragged element from the source browser display.

In another example, the side channel may be a common local storage associated with the web browser. The source browser window can add information about the dragged object to the common local storage and the destination browser window can access this information about the dragged object from the common local storage. Similarly, the destination browser window can add information about the drop operation in the common local storage once the DND operation is completed or terminated. The source browser window can access this information about the drop operation from the common local storage and perform an operation based on the information—i.e., do nothing or delete the draggable item from this current position on the source browser window.

It will be appreciated the examples of side channels described above are merely examples, and any other side channels that can enable communication of information about the draggable item from the source window to the destination window and information about the drop event from the destination window to the source window may be utilized without departing from the scope of the present disclosure. For instance, the side channel may be a broadcast channel that the source or destination window can post messages to and the destination or source window can retrieve messages from, respectively. In another example, the side channel may be a websocket API to which the source or destination window can publish messages to and the destination or source window can subscribe to, respectively. In yet another example, the side channel may be provided by a micro-service or plugin that can accept data and communicate that data from the source to the destination window or vice versa.

These and other aspects of the present disclosure will be described in the following sections.

Figure 2:
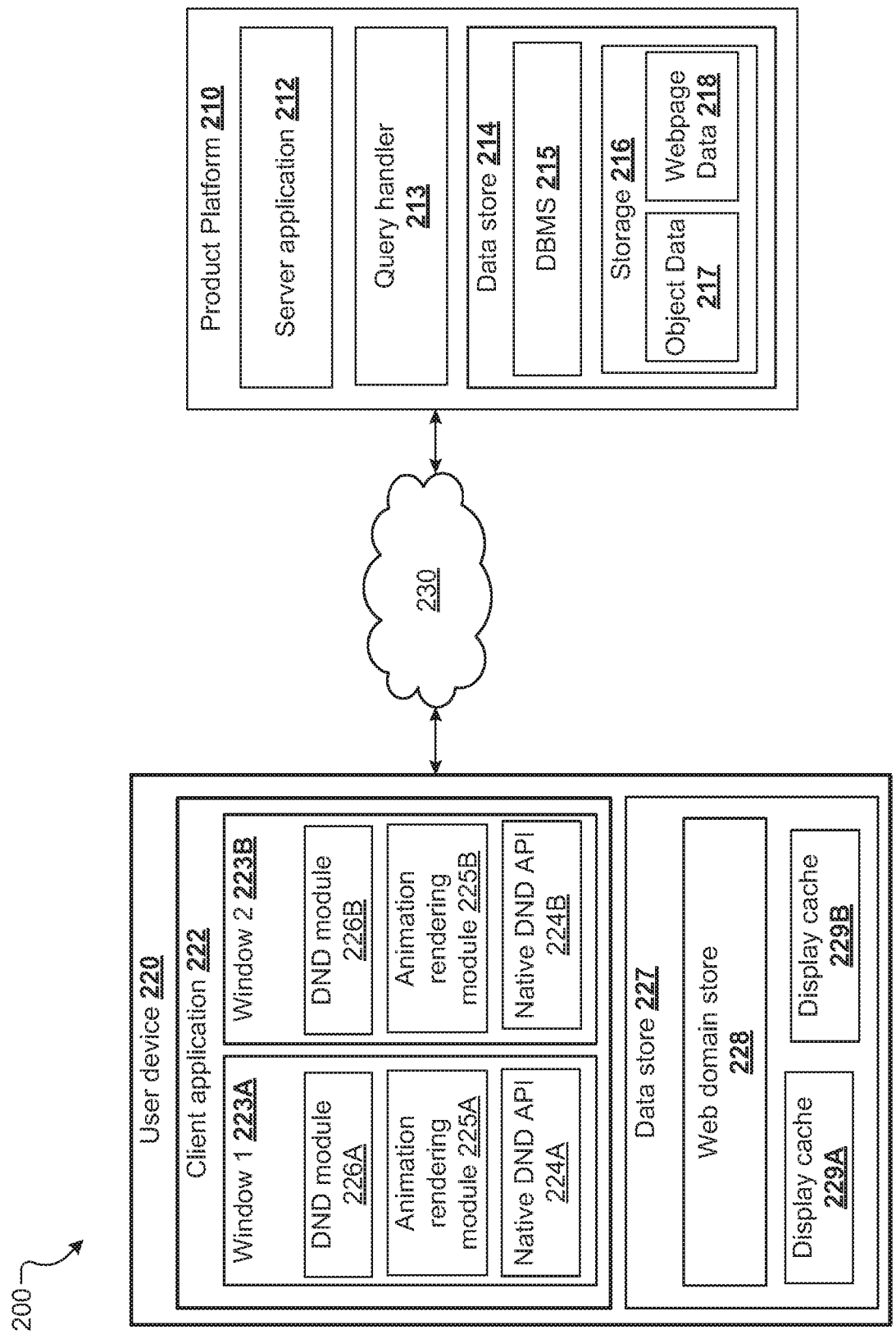
FIG. 2 is a block diagram of a networked environment in which aspects of the present disclosure can be implemented.

FIG. 2 illustrates an example networked environment 200 in which the various operations and techniques described herein can be performed. Specifically, FIG. 2 illustrates the various systems and modules involved cross webpage drag and drop operations. Networked environment 200 includes a product platform 210 and a client device 220, which communicate via one or more communications networks 230.

The product platform 210 may be a system or set of systems configured to provide any type of service/perform any type of operations for clients. In order to provide such services or operations, product platform 210 stores data in a data store 214. As one example, product platform 210 may be an issue tracking system used (inter alia) to create, manage, and track issues. In another example, the product platform 210 may be an object tracking system used to create, manage, and track objects. Product platform 210 may, however, provide other services/perform other operations.

In the present example, product platform 210 includes a server application 212, and a query handler 213.

Server application 212 is executed by a computer processing system to configure that system to provide server-side functionality to one or more corresponding client applications (e.g., client application 222 as discussed below). Further, the server application 212 may be configured to receive data update instructions from the client devices 220 (e.g., based on one or more drag and drop interactions performed by users on displayed web pages such as moving a card from one list to another or from one webpage to another, adding a file, moving a card vertically in a given list, etc.) and may be configured to perform actions based on these instructions, e.g., it may update the main data store 214 based on the received data update instructions. For example, in case a card is moved from a first virtual board to a second, the server application 212 will be configured to delete the card data from the first virtual board and add the card data to the second virtual board.

Server application 212 comprises one or more application programs, libraries, APIs or other software elements that implement the features and functions that are described herein. For example, where the client application 222 is a web browser, the server application 212 is a web server such as Apache, IIS, nginx, GWS, or an alternative web server. Where the client application 222 is a specific/native application, server application 212 is an application server configured specifically to interact with that client application 222.

In some embodiments, the server application 212 may be provided with both web server and application server applications.

The query handler 213 is configured to receive a web page request from a client device 220 and respond to that web page request with data defining the structure (e.g., styling information), content (e.g., the actual data to be displayed on the web page), and behavior (e.g., interactive components) of the web page. In addition, the query handler 213 is configured to provide a DND component to the requesting client device 220 along with the webpage data. To do this, the query handler 213 is configured to identify the requested web page, requesting client device 220 and in some examples a user identifier of the user making the request, retrieve the web page data for the requested web page, and communicate the structure and content to the client device 220. It also communicates a list of components and libraries associated with the webpage either as part of a HTML head or the HTML body to the requesting client device.

In certain embodiments, product platform 210 is a multi-tenanted system: i.e., server application 212 serves multiple tenants. In these embodiments, any request received by the product platform 210 is associated with a particular tenant—e.g., via a tenant identifier. For example, a given request may be received from/initiated by a particular account, and the identifier for that account will be associated with a tenant identifier.

Data store 214 includes one or more database management systems (DBMS) 215 and one or more data storage 216 (operating on one or multiple computer processing systems). Generally speaking, DBMS 215 receives structured query language (SQL) queries from a given application (e.g., server application 212), interacts with data storage 216 to read/write data as required by those queries, and responds to the relevant application with results of the query.

The storage 216 may store any data relevant to the services provided/operations performed by the server application 212. In the present examples, such data includes object data (i.e., data associated with objects) 217 and webpage data 218. In this context, an object is a logical grouping of data. Data 217 for objects may be stored across multiple database records (e.g., across multiple database tables) that are related to one another by one or more database keys (for example object identifiers and/or other identifiers).

By way of specific example, where product platform 210 is an issue tracking system, the object data 217 may be related to issues that are maintained and managed by the system. In this case, various data can be maintained in respect of a given issue, for example: an issue identifier; an issue state; a team or individual to which the issue has been assigned; an issue description; an issue severity; a service level agreement associated with the issue; a tenant to which the issue relates; an identifier of a creator of the issue; a project to which the issue relates; identifiers of one or more issues that the issue is dependent on; identifiers of one or more issues that depend on the issue; identifiers of one or more other stakeholders; and/or other data.

In another example, where the product platform 210 is an object tracking system, in addition to object data (associated with individual tasks), board data may be stored. Board data related to virtual boards maintained by the platform 210. This includes, e.g., for each virtual board, a board identifier, a board name, a board description, a creator of a board, number of columns and/or swimlanes in the board, names of columns and/or swimlanes in the board, a list of objects that are part of the board and a list of assignees associated with those objects. As used herein, such board data is referred to as board state data. The board state data may be stored in one or more tables or storage devices as board state records, where each record corresponds to a given board.

As described above, in addition to object data, the storage 216 further stores web page data 218. For instance, for each web page hosted by the product platform 210, the storage 216 may store static webpage data, web page CSS data, and executable components—e.g., JavaScript functions that retrieve dynamic object data from object and/or board databases, execute one or more functions on the webpage, and/or provide interactivity to the webpage data. In addition, the webpage data 218 includes a DND component.

Although the storage 216 is depicted as being part of the main data store 214, the storage 216 may also be maintained as an in-memory cache. Further, one or more of these databases may be maintained as separate entities with their own DBMS.

The applications executed by product platform 210 typically run on multiple computer processing systems. For example, in some implementations each component of the product platform 210 may be executed on a separate computer processing system. In other embodiments, multiple (or even all) components of the product platform 210 may run on a single computer processing system. In certain cases, a clustered server architecture may be used where applications are executed across multiple computing instances (or nodes) that are commissioned/decommissioned on one or more computer processing systems to meet system demand. For example, the server application 212 may be implemented as multiple nodes connected to the network 230 via a load balancer.

The client device 220 may be any computer processing system which is configured (or configurable) by hardware and/or software to offer client-side functionality. By way of example, suitable client devices may include: server computer systems, desktop computers, laptop computers, netbook computers, tablet computing devices, mobile/smart phones, and/or other computer processing systems.

In some embodiments, client device 220 hosts a client application 222 which, when executed by the client device 220, configures the client device 220 to provide client-side functionality of the product platform 210. This may include, for example, interacting with (i.e., sending data to and receiving data from) server application 212 to render web pages such as web pages 223A and 223B in different browser windows, by way of which a user interacts with the server application 212. Such interactions typically involve logging on (or otherwise accessing) server application 212 by providing credentials for a valid account maintained by the product platform 210. Once validated, a user can perform various functions using client application 222, for example requesting web pages, performing drag and drop operations across web pages, communicating data to the server application 212 at the end of drag and drop operations, etc. In some cases, the web pages 223A and 223B may be provided by the same server application 212 and may have the same domains. In other cases, the webpages 223A and 223B may be provided by different server applications and/or may have different domains.

Client application 222 may be a general web browser application (such as Chrome, Safari, Internet Explorer, Opera, or an alternative web browser application) which accesses a server application such as server application 212 via an appropriate uniform resource locator (URL) and communicates with the server application via general world-wide-web protocols (e.g., HTTP, HTTPS, FTP). When the client application 222 is a web browser, its main function is to present web pages, such as web pages 223A and 223B requested by the user. Further, a given client device 220 may have more than one client application 222, for example it may have two or more types of web browsers.

A web browser has seven main components (not shown)—a user interface, a browser engine, a rendering engine, networking module, user interface backend, JavaScript interpreter, and data storage. The user interface allows users to interact with all visual elements available on a webpage and includes parts of the browser display, such as the address bar (where a user can enter a URL of the webpage the user wishes to view), back/forward buttons, etc. The browser engine organizes actions between the UI and the rendering engine, and the rendering engine is responsible for displaying the requested content. When a web page is requested, the rendering engine analyses the received HTML and CSS files and renders the analysed content on the screen. The user interface backend is used to draw or paint basis widgets like combo boxes and windows and the JavaScript Interpreter is used to parse and execute JavaScript code.

The data storage is a persistence layer where the browser saves data locally, such as drag and drop libraries, cookies, etc. In particular, the web browser 222 may store web-domain data in the data store 227, such that webpages corresponding to a given web domain or website, e.g., www.jira.com, can only store and retrieve data from the data store 227 that is specific to that website or domain and cannot access data stored against any other websites. This is depicted as web-domain store 228. If webpage 1 and 2 are associated with the same website or domain, data from both these webpages can be stored in the web-domain store 228. Alternatively, if webpages 1 and 2 are associated with different websites or domains, data from webpage 1 may be stored in one web domain store that is accessible by webpage 1 and data from webpage 2 may be stored in another web domain store that is accessible by webpage 2 and not webpage 1.

In addition to the above, the client application 222 includes one or more native application programming interfaces (APIs) that are built into the browser and provide native features that can be used by web pages loaded by the browser. In the present case, the client application 222 will include a native DND API 224 for each instance of browser window that is open at any given time. The native DND API 224 enables web pages or applications to use DND features in the browser window. It will be appreciated that a client application 222 typically includes multiple other native APIs, which do not form part of this disclosure and therefore are not described here.

In some embodiments, the native DND API 224 monitors user interaction with a displayed webpage and defines a number of events related to DND operations, which fire when certain user interactions are detected. For example, during a DND operation, the native DND API 224 may fire a "drag start" event when it detects that a user has selected a "draggable" item and has commenced moving their input control across the user interface. Similarly, it may fire a "drag end" event when it detects that the user has stopped the dragging action and released the selected draggable item at a location other than a valid drop location on the user interface. A "drag enter" event may be fired when the API detects that during a dragging operation a cursor has entered a valid drop target, and a "drag leave" event may be fired when the API detects that the cursor has left a valid drop target. Further still, the API may fire a "drag" while a draggable item is being dragged and a "drop" event when the selected draggable item is dropped on a valid drop target.

It will be appreciated that although the native DND API 224 may be provided in most cases, it may not always be utilized. In some embodiments, the DND modules may be configured to work with other DND programs that fire events. In such cases there may be no need for the native DND API 224.

In addition, each browser window may include a corresponding DND module 226A, 226B that is configured to listen to events fired by the corresponding native DND API 224A, 224B, manage the state of the DND operations in the corresponding webpage, bind the events generated by the DND API 224, and determine drop targets in the corresponding webpage during DND operations based on events fired by the DND API 224A. For example, if a drag enter event is fired, the DND module 226A may be configured to identify a valid drop target in webpage 1 based on the position of the cursor.

In the present disclosure, the DND modules 226A and 226B are configured to communicate data about a draggable object during a DND operation and about a drop operation between each other via a side channel. In particular, each DND module may be configured to communicate data about a draggable object to the side channel in case the module is associated with a source browser window and retrieve data about the draggable object from the side channel in case the module is associated with a destination browser window. Similarly, each DND module may be configured to communicate data about a drop operation to the side channel in case the module is associated with a destination browser window and retrieve data about the drop operation from the side channel in case the module is associated with a source browser window.

It will be appreciated that each DND module 226A, 226B may be received from the corresponding server along with webpage data for a requested webpage and it may be loaded and executed by the client application 222 while the webpage is displayed. Once the corresponding webpage is closed, the DND module 226A, 226B may be flushed from the client application 222 memory.

Each loaded webpage 223A, 223B, also includes an animation rendering module 225A, 225B that is configured to render animations in the corresponding webpage during drag and drop events based on the events fired by the corresponding native DND API 224A, 224B and based on communication from the DND module 226A or 226B. For example, the animation rendering module 225A may be configured to drag a selected object across the webpage 223A, highlight one or more drop targets in the webpage 223A as the cursor moves over droppable objects, and un-highlight the one or more drop targets in the webpage 223A as the cursor moves away from those droppable objects.

It will be appreciated that although FIG. 2 shows a single client device and a single product platform 210, in reality, multiple client devices can be in communication with multiple product platforms at any given time.

The product platform 210 and client device 220 communicate data between each other either directly or indirectly through one or more communications networks 230. Communications network 230 may include a local area network (LAN), a public network, or a combination of networks.

The systems and modules described with respect to FIG. 2 are implemented using one or more computer processing systems.

Figure 3:
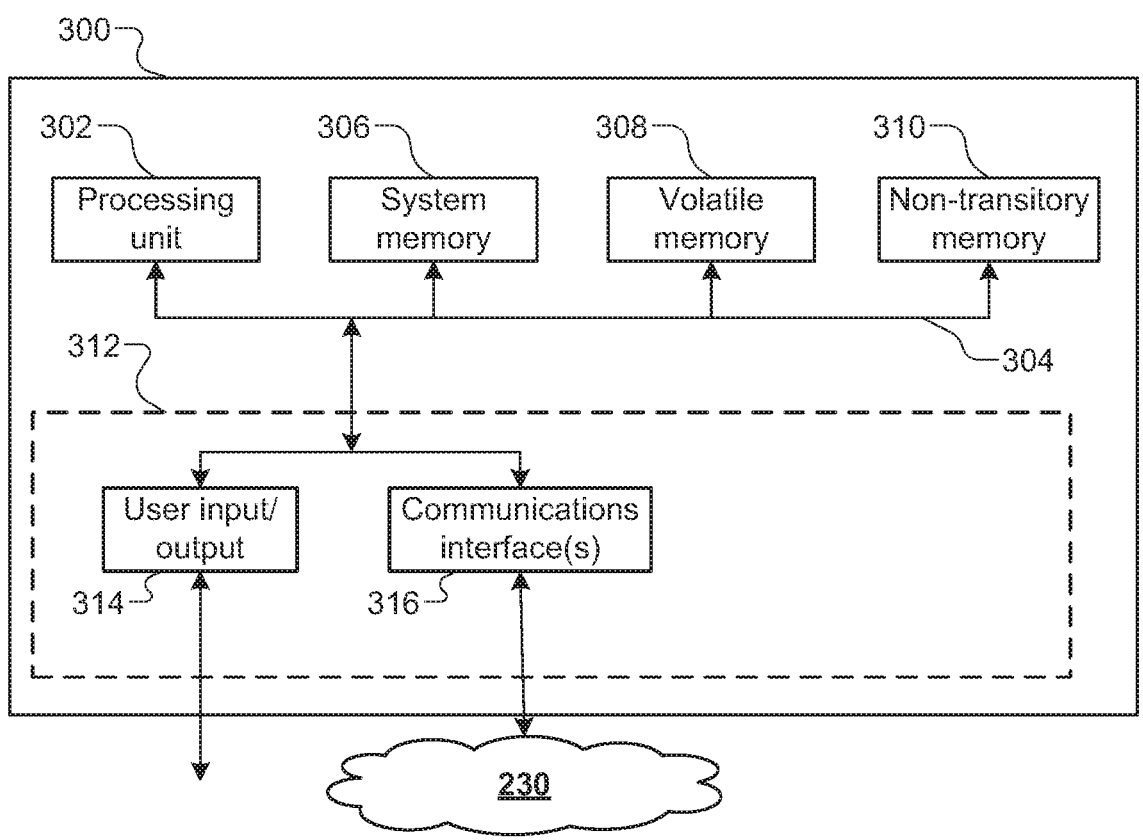
FIG. 3 is a block diagram of a computing system with which various embodiments of the present disclosure may be implemented/configurable to perform various features of the present disclosure.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with one or more computer readable storage devices which store instructions and/or data for controlling operation of the computer processing system 300. In this example, system 300 includes a system memory 306 (e.g., a BIOS), volatile memory 308 (e.g., random access memory such as one or more DRAM applications), and non-volatile (or non-transitory) memory 310 (e.g., one or more hard disks, solid state drives, or other non-transitory computer readable media). Such memory devices may also be referred to as computer readable storage media (or a computer readable medium).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated generally by input/output device interface 314). Input devices are used to input data into system 300 for processing by the processing unit 302. Output devices allow data to be output by system 300. Example input/output devices are described below; however, it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example memory devices/computer readable media (e.g., hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 230 of environment 200. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple iOS™, Android™, Unix™ or Linux™.

System 300 also stores or has access to applications which, when executed by the processing unit 302, configure system 300 to perform various computer-implemented processing operations described herein. For example, and referring to networked environment 200 of FIG. 2 above, client device 220 includes a client application 222 which configures the client device 220 to perform client system operations, and product platform 210 includes server application 212 which configures the server environment computer processing system(s) to perform the described server environment operations.

In some cases, part or all of a given computer-implemented method will be performed by a single computer processing system 300, while in other cases processing may be performed by multiple computer processing systems in data communication with each other.

Example Methods

The following section describes example methods for animating DND operations across browser windows according to aspects of the present disclosure.

As described previously, different types of draggable objects may exist in webpages including, cards in lists, connected lists, images, files, icons, etc. If developers wish to make any other objects/elements in their webpages draggable, they are usually required to add a draggable property to the corresponding HTML element with the value of true to its HTML page. For example, if the web page is for a virtual board, developers may declare all cards in the web page to be draggable. Further, different types of droppable objects may exist—i.e., objects onto which other objects may be dropped (e.g., boxes, lists, etc). In addition, the "droppability" of an object/element—the ability of an object to be considered a valid drop target—may be conditional. For instance, a list may be a valid drop target for any cards. However, a list may not be a valid drop target for other lists (unless combine operations are allowed) or for other entity types, such as files or images. The conditional droppability of objects can also be added as a property to the element in the webpage code.

Figure 4:
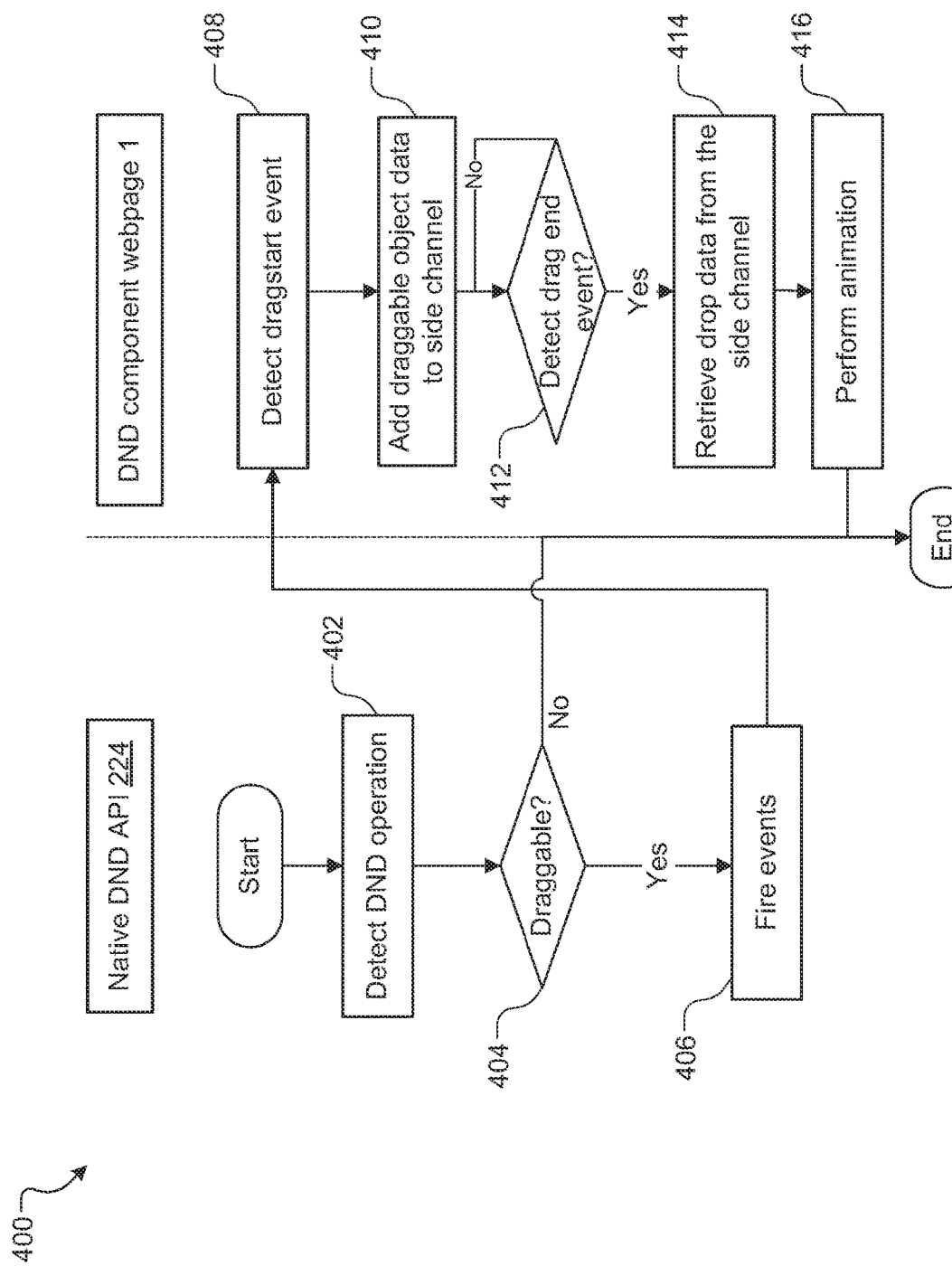
FIG. 4 is a flowchart illustrating a part of an example method for animating a DND operation across browser windows according to aspects of the present disclosure.

FIG. 4 illustrates an example method 400 for animating a DND operation across browser windows according to aspects of the present disclosure. It will be appreciated that method 400 is described with reference to two virtual boards displayed in two browser tabs or windows as webpages 1 and 2. It will be appreciated that this is merely done for the sake of clarity and ease of description. The presently disclosed DND animation rendering methods are by no means restricted to rendering such animations in virtual boards. Instead, they may be utilized to animate DND operations across any other types of webpages that include draggable and droppable objects without departing from the scope of the present disclosure.

Prior to commencement of method 400, a first webpage with draggable and droppable objects and a second webpage with droppable objects may be displayed on the display of a client device. In order to do so, the client application 222 may initially communicate requests for both webpages, e.g., virtual boards 100 and 150 of FIG. 1E, to the query handler 213 of the product platform 210 or may communicate one request to query handler 213 and another request to a query handler of a different product platform 210. This may involve a user entering web page URLs of the two webpages in search bars of different web browser tabs or windows or selecting webpages from a list of search results. In other cases, the browser may automatically generate and send the web page requests, for example, when a user logs into an application hosted by the product platform 210 via a login page. In any event, the web page requests include a URL or any other identifier of the web pages.

In addition to the URL, the web page requests may include some information about the client application 222 making the request (e.g., a client application identifier). If the user is logged into the application, the web page requests may also include a user identifier of the user and in some cases the tenant identifier of the corresponding tenant (for example, if the product application is a multi-tenanted application).

In response to sending the webpage requests, the client application 222 receives the requested webpage data from the query handler(s). To do so, the query handler(s) receive the web page requests, retrieve the requested web content from the data store 214, and communicate it to the client application 222.

Once the client application 222 receives the webpage data, it renders the webpages in different tabs or browser windows on the display of the client device 220. In addition, along with the webpage data, the client application 222 receives the DND components for each webpage and loads these as DND modules 226A and 226B on the client device 220.

Each of the DND modules 226A, 226B once executed, commences one or more event listeners for detecting DND events fired by the corresponding DND API. Once one of the DND modules detects an event, it executes a corresponding function.

Method 400 commences at step 402, where the native DND API 224A detects a DND operation in the first webpage 223A. For example, the DND API 224A may detect that a user has selected an object (e.g., card 110) on the displayed virtual board 100 using a suitable input control means and is attempting to drag that object. It may then determine whether the selected object is draggable (e.g., by inspecting the properties of the object in the HTML code) at step 404. If the DND API 224A determines that the object is not draggable (e.g., because the object's properties do not list that the object is draggable), the DND API 224A does not fire any events and the method 400 ends.

Alternatively, if the DND API 224A determines that the object is draggable, it fires one or more events at step 406 and continues to fire the one or more events until it determines that the DND operation has ended or can no longer detect the cursor in the browser window. The events may include the identifier of the object that is detected to be selected by the user.

At step 408, the DND module 226A listens for and detects a drag start event fired by the DND API 224A.

At step 410, the DND module 226A communicates data about the draggable item to the side channel.

In case the side channel is a data transfer object, the DND module 226A attaches data about the draggable item to the data transfer object. For instance, the DND module 226A may retrieve data about the draggable item and set it in the "format" field as follows— event.dataTransfer=setData(format, value);

That is, instead of adding data about the draggable item to the "value" field, as conventionally done, aspects of the present disclosure add data about the draggable item to the "format" field. If data about the draggable item was added to the "value" field as conventionally done— event.dataTransfer.setData('application/vnd.pdnd-${JSON.stringify({itemId: 'A'})}',' ')

The destination browser window would only be allowed to view the data in the "value" field once a drop event has occurred. However, by adding the draggable object data in the "format" field, aspects of the present disclosure make data about the draggable item available to the destination browser window during the drag operation—as it is possible to retrieve the "format: field during a drag and drop operation.

In one example, data about the draggable object, e.g., an identifier of the card may be provided as part of a vendor specific media type (MIME) in the format field. For example, the data may be added to the drag start event as an encoded MIME format as follows—

```
function getFormat (data:Object): string{
return 'application/vnd.pdnd-${JSON.stringify(data)}';
}
const format = getFormat ({itemId:'A'});
console.log(format);
// 'application/vnd.pdnd-{"itemId":"A"}'
```

Alternatively, if the side channel is the web domain store 228, the DND module 226A may add data about the draggable object (e.g., an object identifier, an object name, etc.) to the web domain store 228 at this step.

In other examples, if the side channel is a broadcast channel, a websocket API or a microservice, the DND module 226A communicates the data about the draggable item to the broadcast channel, websocket, or microservice, respectively.

In addition to adding data about the draggable object to the side channel, the DND module 226A may also cause the animation rendering module 225A to perform one or more animation operations in response to the drag start event. For example, the DND module 226A may cause the animation rendering module 225A to create a ghost image (e.g., image 114) of the selected object and attach the ghost image 114 to the cursor 112. In other examples, the animation rendering module 225A may remove the original selected object (e.g., card 110) from its origin location and attach the object to the cursor 112. In this case, the animation rendering module 225A may also cause the client application 222 to display a placeholder (having the shape and size of the selected card 110) in the original location so that the user knows the position of the object in its original location in case the user wishes to revert the drag and drop operation.

Thereafter, the DND module 226A may continue to receive DND events such as drag events, drag enter events, drag over events, and drag leave events and may continue to perform functions in response to these events which may include causing the animation rendering module to highlight drop targets the cursor has entered to, un-highlight drop targets the cursor has left, etc.

At some point, when the user has dragged the cursor away from the source browser window, the DND module 226A may determine that the cursor has left the window. This determination may be made e.g., if the DND module 226A does not detect any events in a threshold period of time or it may be determined in response to detecting a drag leave event and determining the relatedTarget property of the drag leave event is set to "null"—i.e., the cursor is not currently over any target in the first window.

The DND module 226A may then wait to detect a drag end event at step 412. If the DND module 226A detects a drag end event, the method proceeds to step 414 where the DND module 226A retrieves drop data from the side channel. In case the side channel is a drop effect object associated with the drag end event, the DND module 226A retrieves the drop effect object and determines the drop effect.

At step 416, the DND module 226A may cause the animation rendering module 225A to perform an animation in response to the drop effect. If the DND module 226A determines that the drop effect is 'none' or 'copy,' the DND module 226A may not cause the rendering module 225A to perform any function. Alternatively, if the drop effect is 'move,' it may cause the animation rendering module 225A to opportunistically delete the draggable object from the GUI and may also cause the client application 222 to communicate with the server application 212 to confirm the latest board data for the virtual board 100. If the drop event was successful in a different virtual board (e.g., virtual board 150) and the draggable object was moved to that virtual board, the board data for the virtual board 100 may be already updated when that event occurred. Accordingly, by confirming the drop event with the server state, the DND module 226A ensures that the correct virtual board data is displayed on the display at the end of the DND operation.

Figure 5:
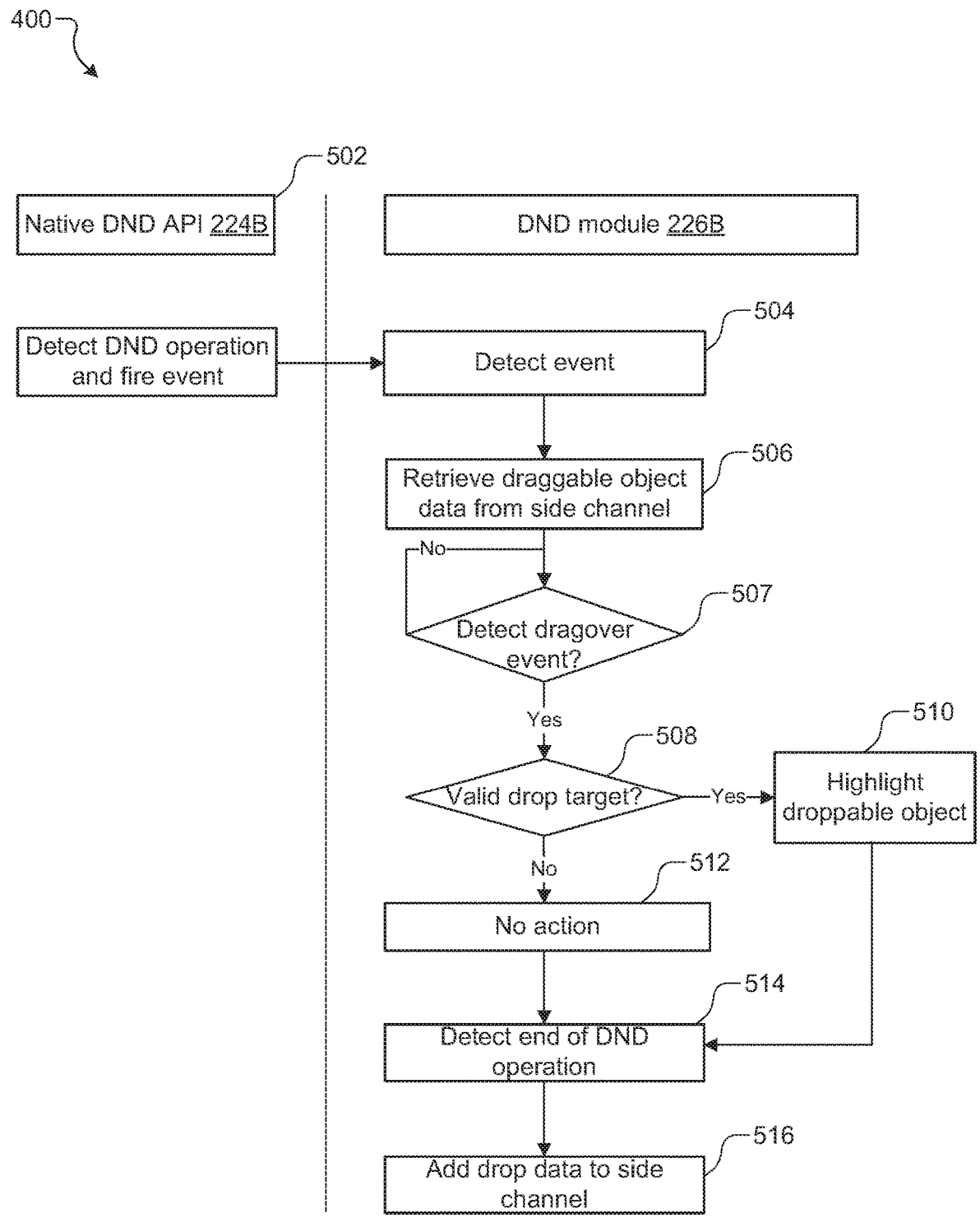
FIG. 5 is a flowchart illustrating another part of an example method for animating a DND operation across browser windows according to aspects of the present disclosure.

FIG. 5 illustrates an example method performed by the destination browser window in response to determining that an object being dragged from a source browser window has entered the destination browser window.

At step 502, the DND API 224B detects that a cursor and draggable object has entered the destination browser window. In this case, the DND API 224B fires an event. In the example depicted in FIG. 1E, the user may have selected card 110 and dragged this card from list 4 of webpage 1 to list 1 of webpage 2 and then continued to drag over list 1 of webpage 2 and reached list 2 of webpage 2. When the cursor 112 reaches the webpage 2, e.g., list 1, the native DND API 224B generates an event. As the DND operation did not commence in the destination browser window, the DND API 224B does not fire a drag start event. Instead, it may fire another event, such as a drag event or a drag enter event.

At step 504, the DND module 226B detects this event.

At step 506, the DND module 226B retrieves data about the draggable item from the side channel. In the example where the sidecar channel is the data transfer object, the DND module 226B may retrieve the data from the data transfer object. In particular, it may decode the encoded MIME value from the "format" field of the data transfer object by looking for a known prefix in the received data transfer objects (e.g., application/vnd.pdnd-'). Upon identifying this known prefix, the DND module 226B may retrieve the data following this prefix and decode it to determine the draggable object's information. In one example, the DND module 223B may use the following function—

```
const prefix = 'application/vnd.pdnd-';
function findData(event: DragEvent): Serializable | null {
    const result: Serializable | null =
    event.dataTransfer.types
        .filter ((value: string) => {
            return value.startsWith(prefix);
        })
        .map((value:string):Serializable | null => {
            const suffix: string = value.split(prefix)[1];
            try {
                return JSON.parse(suffix);
            } catch (e) {
                return null;
            }
        })[0] ?? null;
    return result;
}
```

In other embodiments, where the side channel is the web domain store 228, a broadcast channel, a websocket or a microservice, the DND module 226B may be configured to retrieve the draggable object data from the corresponding side channel.

Thereafter, at step 507, the DND module 226B determines whether the cursor is over a droppable object, e.g., because it has detected a drag enter or drag over event. If the DND module 226B determines that the cursor is over a droppable target, e.g., because it detects a drag enter or drag over event, the method proceeds to step 508, where the DND module 226B determines whether a droppable object the draggable object is over can accept the draggable object. In particular, the DND module 226B determines whether there are any conditions associated with the droppable target. If there are any conditions, it may determine whether those conditions are satisfied by the draggable object—e.g., whether the draggable object is of the type that the droppable object can accept. If the DND module 226B determines that the draggable object meets the condition of the droppable object, it selects the droppable object as a valid drop target and causes the animation rendering module 225B to perform a corresponding animation at step 510—e.g., highlight the droppable object.

Alternatively, if the DND module 226A determines that the draggable object does not meet the condition of the droppable object—e.g., because the draggable object is not of a type that the droppable object can accept, the method proceeds to step 512, where the DND module 226B does not cause the animation rendering module 225A to highlight the droppable object in any way.

Thereafter, the DND module 226B may detect one or more DND events fired by the native DND API 224 as the cursor moves over the webpage 223B in the second browser window and the DND module 226B may perform one or more functions in response to these detected events At some point, while the cursor is moving over webpage 2 during the DND operation, the user may decide to drop the draggable object. In response to this, the native DND API fires an event. If the user ends the operation when the draggable object is not over a droppable target, the DND API may fire a drag end event. Otherwise, if the user ends the operation when the draggable object is over a droppable target, the DN API fires a drop event.

At step 514, the DND module 226B detects the end of the DND operation—e.g., because it detects a drag end or drop event. In response, at step 516, the DND module 226B communicates information about the drop event to the side channel.

In certain embodiments, the DND module 226B determines whether the DND operation has ended because the user has dropped the object on a valid drop target (e.g., because it detected a drop event) or because the user has simply ended the operation by dropping the object over an invalid drop target (e.g., because it has detected a drag end event or determined that the drop target was invalid).

If the DND module 226B determines that the draggable object was not dropped on a valid drop, it may update the side channel with corresponding drop data. Alternatively, if it determines that the draggable object was over a valid drop target, it may update the side channel with corresponding drop data.

If the side channel is a data transfer object, the DND module 226B attaches a drop effect to the data transfer object. In case of the drag end or the drop event when the drop target is not valid, the DND module 226B may add a "none" value as drop effect to data transfer object. Alternatively, in the case of a drop event when the target is valid, the DND module 226B may attach a copy or move drop effect to the data transfer object. Copy indicates that a copy of the source item is made at the new location. Move indicates that the source item has been moved to the new location.

Alternatively, if the side channel is any other channel such as the web domain store 228, a broadcast channel, a websocket API or microservice, the DND module 226B posts the drop data to the corresponding channel. In some cases, the drop data may simply include the drop effect information such as none, copy or move. In other cases, the drop data may provide additional information such as where the object was dropped.

In addition to this, the DND module 226B may also cause the client application 222 to communicate an update request to the server application 212 to update the board data associated with the virtual board 150 in case of a valid drop.

The source browser may detect a drag end event when the object is dropped in the destination browser window and may retrieve information about the drop from the side channel in response to detecting this event as described with reference to method 400.

Accordingly, using aspects of the present disclosure, objects can be dragged from a source browser window and dropped in a destination browser window while also communicating data about the dragged object and the drop between the browser windows via a side channel.

It will be appreciated that although the aspects of the present disclosure are described with reference to browser windows of the same browser type, this need not be the case in all embodiments. In some embodiments, the DND operation may be carried out between browser windows of different browsers—e.g., between a Google Chrome browser window and a Safari browser window without departing from the scope of the present disclosure. Still further, in some embodiments, the disclosed techniques for dragging elements or objects across windows can be used between browser powered applications such as Slack and Discord.

Further, although aspects of the present disclosure are described with reference to an object tracking application, it will be appreciated that this need not be the case. Aspects of the present application can be implemented in user interfaces associated with other types of software applications. For example, aspects of the present disclosure can be used in user interfaces associated with software applications that display interactive data in the form of tables, grids, or lists with interactive or movable objects (such as cells, rows, columns, values) within the tables, grids, or lists.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised," and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A computer-implemented method for animating a drag and drop operation starting in a first browser window running a first instance of a client application in a user device and ending in a second browser window running a second instance of the client application in the user device, the client application corresponding to a virtual task board, the method comprising:
   detecting, at a drag and drop module of the first browser window, a drag start event associated with a draggable element displayed on the first browser window, the draggable element corresponding to a card of the virtual task board;
   adding, by the drag and drop module of the first browser window, element data to a data field of the web-based data transfer object that is accessible during the drag and drop operation, the element data comprising functional object data and dimension data associated with the card, and accessible to the second browser window during a drag and drop operation prior to a drop event;
   prior to the drop event:
      detecting, at a drag and drop module of the second browser window, that the draggable element has entered the second browser window;
      retrieving, by the drag and drop module of the second browser window, the element data about the draggable element from the data field of the web-based data transfer object that is accessible during the drag and drop operation, the drag and drop module configured to determine dimension parameters for displaying the draggable element within the second browser window using the dimensional data from the data field; and
      causing, an animation rendering module of the second browser window, to animate the drag and drop operation in the second browser window based on the dimensional parameters about the draggable element retrieved from the web-based data transfer object, the animation including a rendered element generated based on the dimensional data associated with the card and retrieved by the second browser window.

2. The computer-implemented method of claim 1, wherein the element data about the draggable element includes information about a type of the draggable element.

3. The computer-implemented method of claim 2, further comprising:
   determining, by the drag and drop module of the second browser window, whether the rendered element is over a droppable object;
   upon determining that the draggable element is over the droppable object, determining whether the droppable object includes any conditions regarding draggable element types the droppable object can accept;
   upon determining that the droppable object include a condition regarding the draggable element types it can accept, determining whether a type of the draggable element matches the acceptable draggable element types; and
   upon determining that the type of the draggable element matches one of the acceptable draggable element types, selecting the droppable object as a valid drop target and causing an animation rendering module to highlight the droppable object.

4. The computer-implemented method of claim 3, further comprising:
   upon determining that the type of the draggable element does not match one of the acceptable draggable element types, refraining from causing the animation rendering module to highlight the droppable object.

5. The computer-implemented method of claim 1, wherein the web-based data transfer object is the draggable element and the element data about the draggable element is added to a drag event associated with the draggable element.

6. The computer-implemented method of claim 1, further comprising storing the element data in a common local storage accessible by the first browser window and the second browser window.

7. The computer-implemented method of claim 1, further comprising:
   detecting, by the drag and drop module of the second browser window, a drop event indicating the rendered element has been dropped in the second browser window; and
   communicating, by the drag and drop module of the second browser window, information about the drop event to a side channel.

8. The computer-implemented method of claim 7, further comprising:
   detecting, by the drag and drop module of the first browser window, a drag end event indicating an end of the drag and drop operation; and
   retrieving, by the drag and drop module of the first browser window, the information about the drop event from the side channel.

9. The computer-implemented method of claim 7, wherein the information about the drop event includes at least information about whether the rendered element was dropped on a valid drop target or not, and if the rendered element was dropped on a valid drop target, then the information further includes a corresponding drop effect.

10. The computer-implemented method of claim 9, further comprising:
   inspecting, by the drag and drop module of the first browser window, the information about the drop event retrieved from the side channel; and
   causing, an animation rendering module of the first browser window, to delete the draggable element from the first browser window upon determining that the rendered element was dropped on a valid drop target, as indicated by the information about the corresponding drop effect in the side channel.

11. A non-transitory computer readable medium comprising instructions, which when executed by a processing unit, cause a browser application to:
   detect, in first browser window running a first instance of a client application in a user device, a drag start event associated with a draggable element displayed on the first browser window, the client application corresponding to a virtual task board;
   add, by the first browser window, element data to a data field of the web-based data transfer object that is accessible during the drag and drop operation, the element data comprising functional object data and dimension data associated with the card, and accessible to the second browser window during a drag and drop operation prior to a drop event;
   prior to the drop event:
      communicate, by the first browser window, the element data about the draggable element to a side channel;
      detect, at a second browser window running a second instance of the client application in the user device, that the draggable element has entered the second browser window;
      retrieve, by the second browser window, the element data about the draggable element from the data field of the web-based data transfer object that is accessible during the drag and drop operation, the drag and drop module configured to determine dimension parameter for displaying the draggable element within the second browser window using the dimensional data from the data field; and
      cause an animation rendering module of the second browser window to animate the drag and drop operation in the second browser window based on the dimensional parameters about the draggable element retrieved from the web-based data transfer object side channel, the animation including a rendered element generated based on the dimensional data associated with the card and retrieved by the second browser window.

12. The non-transitory computer readable medium of claim 11, wherein the element data about the draggable element includes information about a type of the draggable element.

13. The non-transitory computer readable medium of claim 12, further comprising instructions which when executed by a processing unit, cause the browser application to:
   by the second browser window:
      determine whether the rendered element is over a droppable object;
      upon determining that the rendered element is over the droppable object, determine whether the droppable object includes any conditions regarding draggable element types the droppable object can accept;
      upon determining that the droppable object include a condition regarding the draggable element types it can accept, determine whether a type of the draggable element matches the acceptable draggable element types; and
      upon determining that the type of the draggable element matches one of the acceptable draggable element types, select the droppable object as a valid drop target and causing an animation rendering module to highlight the droppable object.

14. The non-transitory computer readable medium of claim 11, wherein the web-based data transfer object the side channel is the draggable element and the element data about the draggable element is added to a drag event associated with the draggable element.

15. The non-transitory computer readable medium of claim 11, further comprising storing the element data in wherein the side channel is a common local storage accessible by the first browser window and the second browser window.

16. The non-transitory computer readable medium of claim 11, further comprising instructions, which when executed by the processing unit, cause the browser application to:
   detect, by the second browser window, a drop event indicating the rendered element has been dropped in the second browser window; and
   communicate, by the second browser window, information about the drop event to the a side channel.

17. The non-transitory computer readable medium of claim 16, further comprising instructions which when executed by a processing unit, cause the browser application to:
   detect, by the first browser window, a drag end event indicating an end of the drag and drop operation;
   retrieve, by the first browser window, the information about the drop event from the side channel.

18. The non-transitory computer readable medium of claim 17, wherein information about the drop event includes at least information about whether the draggable element was dropped on a valid drop target or not, and if the rendered element was dropped on a valid drop target, then the information further includes a corresponding drop effect.

19. The non-transitory computer readable medium of claim 18, further comprising instructions which when executed by a processing unit, cause the browser application to:
   inspect, by the first browser window, the information about the drop event retrieved from the side channel; and
   cause, an animation rendering module of the first browser window, to delete the draggable element from the first browser window upon determining that the rendered element was dropped on a valid drop target, as indicated by the information about the corresponding drop effect in the side channel.

* * * * *